(No Model.)
F. WIDMER.
PRESSURE REGULATOR.
No. 323,093. Patented July 28, 1885.
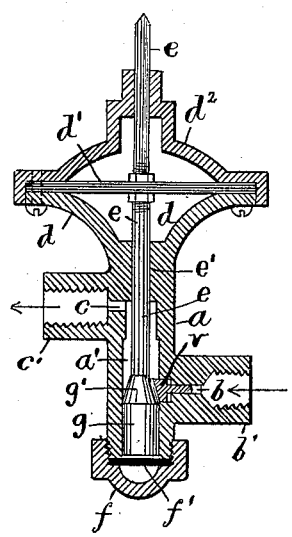
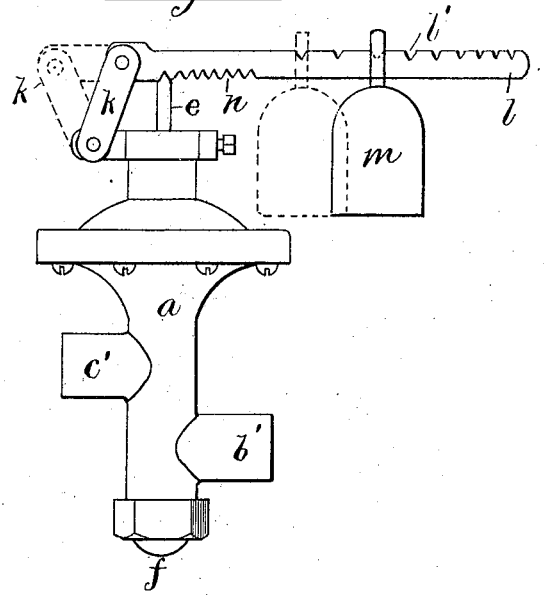
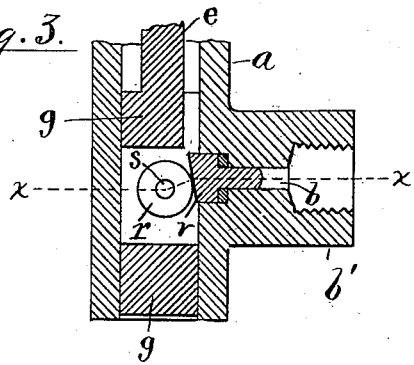
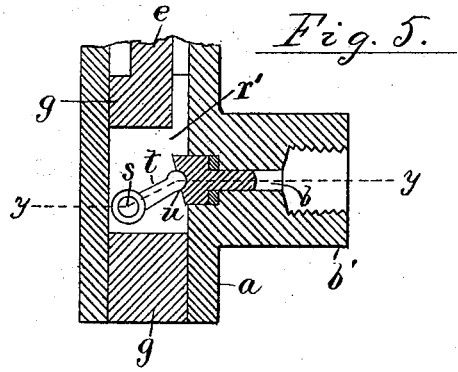
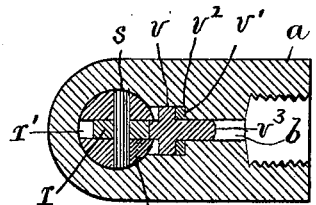
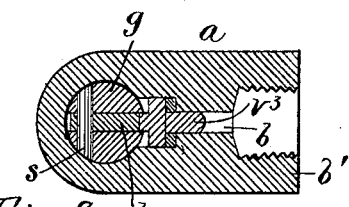
Attest.
W. D. Bradshaw
Henry J. Theberath
Inventor.
Frank Widmer, per
Crane & Miller Attys

UNITED STATES PATENT OFFICE.

FRANK WIDMER, OF NEWARK, NEW JERSEY.

PRESSURE-REGULATOR.

SPECIFICATION forming part of Letters Patent No. 323,093, dated July 28, 1885.

Application filed March 18, 1885. (No model.)

*To all whom it may concern:*

Be it known that I, FRANK WIDMER, a citizen of the United States, residing in Newark, Essex county, New Jersey, have invented certain new and useful Improvements in Pressure-Regulators, fully described and represented in the following specification and the accompanying drawings, forming a part of the same.

This invention is intended to maintain a uniform pressure in a chamber which is connected, through the medium of the pressure-regulator, with a reservoir of fluid under a higher pressure; and my regulator includes, like others of such class, a flexible diaphragm in communication with the pressure in said chamber, and a valve in communication with the pressure in the said reservoir, the function of the regulator being to open the valve when the pressure in the chamber falls below the desired point, and to close the valve and check the admission of fluid from the reservoir to the chamber when the desired pressure in the chamber has been again attained; and the construction shown herein operates so sensitively and effectively as to maintain a practically uniform pressure in the chamber with which it is connected. I have therefore been able to maintain a uniform pressure, as in beer-barrels, of only two pounds per square inch when connected with a reservoir under a pressure of five hundred pounds per square inch. To effect such a result I construct the valve with a stem and head, which are fitted to suitable apertures with such nicety that the flow of fluid past the valve is very closely restricted when the valve-seat is open; and I also fit the diaphragm-spindle to the neck of the diaphragm-box so closely that the fluid-pressure is admitted thereto very gradually, and by these means am enabled to prevent the violent movements of the diaphragm and valve and the extreme variation of pressure which arises within the receiving-chamber when the construction affords a free inlet at any time to the fluid under pressure.

My improvement consists, primarily, in the combination, with the spindle, of a diaphragm which is affected by the pressure which is to be regulated, and a valve moving laterally to the said spindle and operated by a positive lateral connection from the same, so as to be positively seated by the movement of the diaphragm, and locked or held positively upon its seat by the said spindle.

It also consists in the construction of the diaphragm-box and the spindle and the connection between such box and the chamber in which the pressure is to be regulated, whereby the pressure is admitted more rapidly into such chamber than into the diaphragm-box, and thereby prevents the diaphragm from acting and closing the valve before the desired pressure has been attained in the said chamber.

It also consists in the special construction for the pressure-regulating lever for varying the effect of the weight applied thereto.

Figure 1 is a side view of the apparatus with the weight adjusted to produce a high pressure, the adjustment of the same for producing a lower pressure with the same weight being shown in dotted lines. Fig. 2 is a central section of the valve, the casing, and the diaphragm-box, with the entire diaphragm and spindle with conical bearing therein. Fig. 3 is a section of the casing adjacent to the valve, with a modified construction for the spindle-plug, showing a roller-bearing in the plug; and Fig. 4 is a section of the same on line $x\ x$ in Fig. 3. Fig. 5 is a view similar to Fig. 3, showing a toggle-link connecting the spindle and the valve; and Fig. 6 is a section of the same on line $y\ y$ in Fig. 5. Fig. 7 is an end view, and Fig. 8 a side view, of the valve detached. Figs. 3 to 8, inclusive, are drawn upon a larger scale than Figs. 1 and 2.

$a$ is the regulator-casing; $b$, the inlet from the reservoir or source of pressure; $c$, the outlet to the chamber into which the pressure is to be introduced and regulated. $b'$ and $c'$ are the usual pipe-sockets connected therewith.

$d$ is a diaphragm-box formed upon the end of the casing $a$, and $d'$ the diaphragm, held therein by its edges and a cap, $d^2$, as usual. The interior of the casing at $a'$ is bored out at the end opposite to the diaphragm, to snugly fit a sliding plug, $g$, formed upon the diaphragm-spindle.

$e$ is the diaphragm-spindle, attached to the diaphragm, and passing from the box through a snugly-fitting neck or collar, $e'$, to the interior of the casing at $a'$, and having the plug $g$ attached thereto.

The end of the casing is provided with a movable cap, $f$, and a lead washer, $f'$, to tightly close the same.

$v$ is the head of the valve, faced with a leather washer, $v^2$, and provided with a valve-stem, $v^3$. The inlet $b$ is formed in the casing at right angles to the spindle, and is enlarged adjacent to the plug $g$ to form a valve-seat, against which the leather is pressed when the valve is closed, the inlet $b$ and the bore of the valve-seat being fitted snugly to the corresponding parts $v^3$ and $v$ upon the valve, to secure the utmost restriction of the fluid past the valve when open, and to thus avoid any sudden changes of pressure in the receiving-chamber.

The movement of the valve being at right angles to that of the spindle $e$, various modes of closing the valve by the movement of the spindle may be devised, three of which are shown herein.

In Fig. 2 the spindle or its enlarged plug $g$ is shown provided with a cone, $g'$, adjacent to the valve $v$, and the head of the valve is beveled to fit such conical surface. With such construction the regulator is connected with the source of pressure at $b'$ and with a receiving-chamber at $c'$, and the operation of the regulator is therefore secured by weighting the diaphragm to any required degree, as by lever $l$ and weight $m$, the pressure admitted to the interior of the casing $a'$ gaining access to the diaphragm-box $d$ by passing between the spindle and the collar $e'$ and moving the spindle longitudinally in the casing when the desired pressure in the receiver has been attained. Such longitudinal movement obviously forces the side of the cone against the head of the valve, and operates, first, to press the same hard upon its seat, and, secondly, to hold or lock the same there until the diaphragm yields to the weight $m$ under a diminished pressure in the casing $a'$. The plug $g$ operates merely to sustain the cone in exerting the required lateral pressure, and the maximum pressure desired in the receiving-chamber is effectually secured before the pressure flowing into the casing at $a$ is capable of affecting the diaphragm by reason of the open passage between the casing and the chamber at the outlet $c$ and the contracted passage to the box $d$ between the spindle and the collar $e'$.

In Figs. 3 and 4 a roller, $r$, pivoted on a pin, $s$, is shown inserted in a slot, $r'$, formed in the plug and operating against the inclined head of the valve, the same as the cone $g'$. The roller is guided in a straight line by the plug $g$, and thus forces the valve upon its seat and holds it there when the spindle moves longitudinally.

In Fig. 5 a little crank, $t$, is applied to the pin $s$ in a slot, $r'$, in the plug $g$, and has its free end fitted to a recess, $u$, in the valve-head, the crank being inclined to the axis of the valve, so as to push it upon its seat when the spindle is moved by the diaphragm.

I find that the only leather which will make a tight joint with this valve under high pressure is one soaked with tallow or with other fat or oil, like the lacing-leather thus "stuffed" to make it pliable, thus closing all its pores.

To adapt a single apparatus to the regulation of a great range of pressure with a short lever or light weight, I connect the lever $l$ with the casing-head $a^2$ by a flexible or jointed link, $k$, and provide the lever, in addition to the series of notches $l'$ for setting the weight $m$, with a series of notches, $n$, near the fulcrum and fitted to the head of the diaphragm spindle. The top of the link $k$ thus becomes an adjustable fulcrum, the spindle $e$ being guided vertically by a hole through the top of the cap $d^2$, and serving in turn to retain the lever and weight in the desired relation to the spindle when the selected notch $n$ is fitted to the top of the latter.

In Fig. 1 the fulcrum is shown close to the spindle, and the weight in the third notch $l'$ from the latter, thus producing a pressure upon the spindle about eight times as great as the weight $m$; but when the fulcrum is shifted, as to the position shown by the link $k$ in dotted lines, the leverage of the weight may be so altered as to press but little more upon the spindle than twice its weight.

By the pivoting of the lever on the jointed link, and forming it with the notches $n$, I am thus able to vary the pressure in a very great degree.

I am aware that a conical plug has been used to shift a valve laterally, as in United States Patent No. 134,177, and I do not therefore claim such means of moving the valve apart from the diaphragm, the tight collar $e'$, and the particular construction of the valve $v$.

I am aware of the state of the art shown in United States Patents Nos. 312,543, 21,544, and 224,575; but my invention differs from such constructions in the following respects: first, in the snug fitting of the valve and its stem to the inlet $b$ and the facing of the valve with leather, whereby sudden movements of the diaphragm are prevented, and, secondly, in the snug fitting of the diaphragm-spindle to a collar intermediate to the diaphragm-box $d$ and the casing $a'$, with which the inlet $b$ and outlet $c$ are connected, whereby the pressure is prevented from actuating the diaphram and valve until the desired pressure is secured in the chamber $c'$. I therefore disclaim the said patents.

I am also aware of United States Patent No. 208,759, in which a lever is provided with a series of notches to vary the operative fulcrum; but in the invention referred to the lever does not rest upon the head of a diaphragm-spindle, and is not linked directly to the diaphragm-box. I therefore disclaim the said patent, and limit myself to the precise combination herein claimed, in which I make both the fulcrum and weight adjustable, and link the end of the lever directly to the diaphragm-box.

What I claim herein is—

1. The combination, in a pressure-regulator, of the means for preventing the violent movements of the diaphragm, consisting in the valve having a head, $v$, and stem $v^3$, fitted snugly to their respective apertures, with the washer $v^2$, applied to the stem, and the means for connecting the valve with the diaphragm for pressing the valve upon its seat, substantially as shown and described.

2. In a pressure-regulator, the combination of the casing $a$ with the diaphragm-box $d$ and the collar $e'$, between the casing and the box, the spindle $e$, secured to the diaphragm and being projected above the box and fitted snugly to the collar, as set forth, the free outlet $c$, connecting with the receiving-chamber, the valve $v$, provided with leather washer $v^2$, and located in the inlet-passage at right angles to the spindle $e$, and the conical plug $g'$, attached to the spindle and operating against the inclined head of the valve, the whole being arranged and operated substantially as and for the purpose set forth.

3. In a pressure-regulator, the combination of the casing $a$, provided with the inlet $b$, having the valve fitted snugly, as described, the diaphragm-box, and the spindle $e$, with the snugly-fitting collar $e'$ between the casing and the box, and the free outlet $c$, connecting with the receiving-chamber, the whole arranged and operated with a weight and lever for depressing the diaphragm substantially as herein shown and described.

4. In a pressure-regulator, the means for varying the effect of the weight upon the diaphragm, consisting in the combination, with the diaphragm-box $d^2$ and the projecting end of its spindle $e$, of the lever $l$, the links $k$, jointed to the diaphragm-box $d^2$, the lever being provided with a series of notches, $n$, to fit the top of the spindle, and the adjustable weight $m$, the whole arranged and operated substantially as shown and described.

In testimony whereof I have hereunto set my hand in the presence of two subscribing witnesses.

FRANK WIDMER.

Witnesses:
   Thos. S. Crane,
   Henry J. Theberath.